(12) United States Patent
Hwang

(10) Patent No.: US 8,766,852 B2
(45) Date of Patent: Jul. 1, 2014

(54) ELECTRONIC DEVICE AND CONTROL METHOD THEREOF

(75) Inventor: Chieh-Tsao Hwang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 302 days.

(21) Appl. No.: 13/230,867

(22) Filed: Sep. 13, 2011

(65) Prior Publication Data
US 2012/0062424 A1   Mar. 15, 2012

Related U.S. Application Data

(60) Provisional application No. 61/382,498, filed on Sep. 14, 2010.

(51) Int. Cl.
*H01Q 3/02* (2006.01)

(52) U.S. Cl.
USPC .......................................................... 342/374

(58) Field of Classification Search
USPC .......................................................... 342/374
See application file for complete search history.

(56) References Cited

U.S. PATENT DOCUMENTS

| | | | |
|---|---|---|---|
| 2008/0143609 A1* | 6/2008 | Mashima et al. | 343/702 |
| 2008/0212489 A1* | 9/2008 | Lee et al. | 370/253 |
| 2012/0162040 A1* | 6/2012 | Taura et al. | 343/770 |

FOREIGN PATENT DOCUMENTS

JP    11-234162    8/1999

OTHER PUBLICATIONS

"Office Action of Korea Counterpart Application", issued on Oct. 31, 2013, with English translation thereof, p. 1-p. 10.

* cited by examiner

*Primary Examiner* — Harry Liu
(74) *Attorney, Agent, or Firm* — Jianq Chyun IP Office

(57) ABSTRACT

An electronic device including a first antenna, a second antenna, a first sensor, a signal processing module and an antenna control module is provided. The first antenna has a function of transmitting a wireless signal and is disposed on a first side of the electronic device. The second antenna is disposed on a second side of the electronic device. The first sensor detects whether a first object is around the first antenna and generates a first sensing signal according to a detecting result. The signal processing module generates a first control signal according to the first sensing signal. The antenna control module switches the function of transmitting the wireless signal from the first antenna to the second antenna.

44 Claims, 4 Drawing Sheets

ELECTRONIC DEVICE AND CONTROL METHOD THEREOF

CROSS-REFERENCE TO RELATED APPLICATION

This application claims the priority benefits of U.S. provisional application Ser. No. 61/382,498, filed on Sep. 14, 2010. The entirety of the above-mentioned patent application is hereby incorporated by reference herein and made a part of this specification.

BACKGROUND OF THE INVENTION

1. Field of the Invention

The present invention relates to an electronic device and more particularly, to an electronic device with two built-in antennas.

2. Description of Related Art

Generally speaking, the electromagnetic wave radiated from the antenna is hazardous to the human beings. Thus, the Federal Communications Commission (FCC) specifies a specific absorption ratio (SAR) of mobile communication device in order to limit the maximum energy radiated from a mobile communication device.

In addition, in order to ensure the communication quality of the electronic device, over the air (OTA) testing method is a standard criterion to evaluate the whole communication quality of the electronic device. Herein total radiated power (TRP) is an index measuring parameter of the OTA testing method and used to estimate the transmitter radiation hardness of the electronic device.

However, in the conventional electronic device in order to ensure the SAR value complies with the standard criterion, just the radiated power is reduced so as to maintain the SAR value to be in a safe testing range. But the transmitting distance of the electromagnetic wave may be reduced with the decrease of TRP, and the communication quality of the electronic device may further be affected. Therefore, how to consider the hardware space of the mobile electronic device under circumstances of enhancing transmission mechanisms of wireless communication is a great issue faced in development of the electronic devices.

SUMMARY OF THE INVENTION

The present invention provides an electronic device using sensors to detect the object around the antenna and using the antenna with no object around thereof to transmit wireless signals. Thus, the specific absorption ratio (SAR) of the electronic device complies with the testing criterion and the communication quality of the electronic device can further be maintained.

The present invention provides an electronic device using sensors and a metal detector to detect the object around the antenna, and further determining whether the object around the antenna is a human body. In addition, the electronic device of the present invention uses the antenna with no human body around thereof to transmit wireless signals so that the specific absorption ratio (SAR) complies with the testing criterion and the communication quality of the electronic device can further be maintained.

The present invention provides an electronic device including a first antenna, a second antenna, a first sensor, a signal processing module and an antenna control module. The first antenna having a transmitting wireless signal function is disposed on a first side of the electronic device. The second antenna is disposed on the second side of the electronic device. The first sensor is adapted to detect whether a first object exists around the first antenna and generate a first sensing signal according to a detecting result. The signal processing module is adapted to generate a first control signal according to the first sensing signal. The antenna control module is adapted to switch the transmitting wireless signal function from the first antenna to the second antenna according to the first control signal.

According to an embodiment of the present invention, when the signal processing module is unable to receive the first sensing signal for a predetermined time, the signal processing module generates a second control signal so that the antenna control module transmits the transmitting wireless signal function from the second antenna to the first antenna, wherein the first sensing signal is a signal generated by the first sensor when detecting that the first object exists within a predetermined area around the first antenna.

According to an embodiment of the present invention, the electronic device further includes a second sensor. Herein the second sensor is adapted to detect whether a second object exists around the second antenna and generate a second sensing signal according to a detecting result, wherein when the signal processing module receives the second sensing signal, the signal processing module generates a second control signal so that the antenna control module switches the transmitting wireless signal function from the second antenna to the first antenna.

According to an embodiment of the present invention, when the signal processing module simultaneously receives the first sensing signal and the second sensing signal, the signal processing module generates a power adjusting signal so as to reduce a power of the first antenna or the second antenna transmitting a wireless signal, wherein the second sensing signal is a signal generated by the second sensor when detecting that the second object exists within a second predetermined area around the second antenna.

According to an embodiment of the present invention, the second sensor is adjacent to the second antenna and located at the second side.

According to an embodiment of the present invention, the first sensor is a light sensor, a motion sensor or an acceleration sensor.

According to an embodiment of the present invention, the signal processing module is formed by a central processing unit, and the central processing unit is electrically connected to the first sensor and the antenna control module.

According to an embodiment of the present invention, the signal processing module includes a controller and a central processing unit. The controller is electrically connected to the first sensor, wherein a first switching signal is generated after the controller receives the first sensing signal. The central processing unit is electrically connected to the controller and the antenna control module, and generates the first control signal according to the first switching signal.

According to an embodiment of the present invention, the antenna control module includes a network module and a switching unit. The switching unit has a first terminal electrically connected to the network unit, a second terminal electrically connected to the first antenna and a third terminal electrically connected to the second antenna, wherein the switching unit conducts the first terminal to the third terminal according to the first control signal.

According to an embodiment of the present invention, the network module is a Wireless Wide Area Network module.

According to an embodiment of the present invention, the first side of the electronic device is parallel to the second side.

According to an embodiment of the present invention, the first sensor is adjacent to the first antenna and located at the first side. The present invention further provides an electronic device including a first antenna, a second antenna, a first sensor, a metal detector, a signal processing module and an antenna control module. The first antenna having a transmitting wireless signal function is disposed on a first side of the electronic device. The second antenna is disposed on the second side of the electronic device. The first sensor is adapted to detect whether a first object exists around the first antenna and generate a first dielectric constant according to a detecting result. The metal detector is adapted to determine whether the first object is a metal or not, and generate a first metal identification signal when the first object is determined as a metal. The signal processing module is adapted to generate a first control signal according to the first dielectric constant and the first metal identification signal. The antenna control module is adapted to switch the transmitting wireless signal function from the first antenna to the second antenna according to the first control signal.

According to an embodiment of the present invention, when the signal processing module is unable to receive the first dielectric constant for a predetermined time, the signal processing module generates a second control signal so that the antenna control module switches the transmitting wireless signal function from the second antenna to the first antenna, wherein the first dielectric constant is a signal generated by the first sensor when detecting that the first object exists within a predetermined area around the first antenna, and the first dielectric constant is the dielectric constant of the first object.

According to an embodiment of the present invention, when the signal processing module determines that the first dielectric constant is equal to a human body dielectric constant and the first metal identification signal is not received, then the signal processing module generates the first control signal so that the antenna control module switches the transmitting wireless signal function from the first antenna to the second antenna.

According to an embodiment of the present invention, when the signal processing module determines that the first dielectric constant is equal to a human body dielectric constant and but the first metal identification signal is received, then the signal processing module does not generate the first control signal.

According to an embodiment of the present invention, when the signal processing module determines that the first dielectric constant is not equal to a human body dielectric constant, the signal processing module does not generate the first control signal.

According to an embodiment of the present invention, the electronic device further includes a second sensor. The second sensor is adapted to detect whether a second object exists around the second antenna and generate a second dielectric constant according to a detecting result, wherein the metal detector determines whether the second object is a metal or not, and generates a second metal identification signal when the second object is determined as a metal.

According to an embodiment of the present invention, the signal processing module generates a second control signal according to the second dielectric constant and the second metal identification signal, so that the antenna control module switches the transmitting wireless signal function from the second antenna to the first antenna, wherein the second dielectric constant is a signal generated by the second sensor when detecting that the second object exists within a second predetermined area around the second antenna, and the second dielectric constant is a dielectric constant of the second object.

According to an embodiment of the present invention, when the signal processing module determines that both the first dielectric constant and the second dielectric constant are equal to the human body dielectric constant and the first metal identification signal and the second metal identification signal are not received, then the signal processing module generates a power adjusting signal so to reduce a power of the first antenna or the second antenna transmitting a wireless signal.

According to an embodiment of the present invention, when the signal processing module determines that the second dielectric constant is equal to a human body dielectric constant and but the second metal identification signal is received, then the signal processing module does not generate the second control signal.

According to an embodiment of the present invention, when the signal processing module determines that the second dielectric constant is not equal to a human body dielectric constant, the signal processing module does not generate the second control signal.

According to an embodiment of the present invention, the first sensor is a capacitive proximity sensor.

According to an embodiment of the present invention, the metal detector is an electromagnetic sensor or an E-compass.

According to an embodiment of the present invention, the signal processing module is formed by a central processing unit, and the central processing unit is electrically connected to the first sensor, the metal detector and the antenna control module.

According to an embodiment of the present invention, the signal processing module includes a controller and a central processing unit. The controller is electrically connected to the first sensor and the metal detector and determines whether the first dielectric constant is equal to the human body dielectric constant through a lookup table, wherein when the first dielectric constant is equal to the human body dielectric constant and the controller does not receive the first metal identification signal, the controller generates a first switching signal. The central processing unit is electrically connected to the controller and the antenna control module, and generates the first control signal according to the first switching signal.

According to an embodiment of the present invention, the controller is an embedded controller.

The present invention further provides an electronic device control method including the following steps: (a) actuating an electronic device, wherein the electronic device comprises a first antenna and a second antenna; (b) proceeding to a transmitting a wireless signal function by using the first antenna; (c) detecting whether a first object exists around the first antenna by using a first sensor and generating a first sensing signal according to a detecting result; (d) generating a first control signal according to the first sensing signal by using a signal processing module; and (e) switching the transmitting wireless signal function from the first antenna to the second antenna according to the first control signal by using an antenna control module.

According to an embodiment of the present invention, the electronic device control method further includes the following steps: (f) detecting whether a second object exists around the second antenna by using a second sensor and generating a second sensing signal according to a detecting result; (g) generating a second control signal according to the second sensing signal by using the signal processing module; and (h) switching the transmitting wireless signal function from the second antenna to the first antenna according to the second control signal by using the antenna control module.

According to an embodiment of the present invention, when the signal processing module simultaneously receives the first sensing signal and the second sensing signal, the signal processing module generates a power adjusting signal so as to reduce a power of the first antenna or the second antenna transmitting a wireless signal, wherein the second sensing signal is a signal generated by the second sensor when detecting that the second object exists within a second predetermined area around the second antenna.

According to an embodiment of the present invention, the first sensor is adjacent to the first antenna and located at the first side of the electronic device.

According to an embodiment of the present invention, the second sensor is adjacent to the second antenna and located at the second side of the electronic device.

The present invention further provides an electronic device control method including the following steps: (a) actuating an electronic device, wherein the electronic device comprises a first antenna and a second antenna; (b) proceeding to a transmitting a wireless signal function by using the first antenna; (c) detecting whether a first object exists around the first antenna by using a first sensor and generating a first dielectric constant according to a detecting result; (d) determining whether the first object is a metal or not by using a metal detector, and generating a first metal identification signal when the first object is determined as a metal; and (e) generating a first control signal by using a signal processing module according to the first dielectric constant and the first metal identification signal; (f) switching the transmitting wireless signal function from the first antenna to the second antenna according to the first control signal by using an antenna control module.

According to an embodiment of the present invention, when the signal processing module determines that the first dielectric constant is equal to a human body dielectric constant and the first metal identification signal is not received, then the signal processing module generates the first control signal so that the antenna control module switches the transmitting wireless signal function from the first antenna to the second antenna.

According to an embodiment of the present invention, when the signal processing module determines that the first dielectric constant is equal to a human body dielectric constant and but the first metal identification signal is received, then the signal processing module does not generate the first control signal.

According to an embodiment of the present invention, when the signal processing module determines that the first dielectric constant is not equal to a human body dielectric constant, the signal processing module does not generate the first control signal.

According to an embodiment of the present invention, the electronic device control method further includes the following steps: (g) detecting whether a second object exists around the second antenna by using a second sensor and generating a second dielectric constant according to a detecting result; (h) determining whether the second object is a metal or not by using the metal detector, and generating a second metal identification signal when the second object is determined as a metal; (i) generating a second control signal according to the second dielectric constant and the second metal identification signal by using the signal processing module; and (j) switching the transmitting wireless signal function from the second antenna to the first antenna according to the second control signal by using the antenna control module.

According to an embodiment of the present invention, the second dielectric constant is a signal generated by the second sensor when detecting that the second object exists within a second predetermined area around the second antenna, and the second dielectric constant is a dielectric constant of the second object.

According to an embodiment of the present invention, when the signal processing module determines that both the first dielectric constant and the second dielectric constant are equal to the human body dielectric constant and the first metal identification signal and the second metal identification signal are not received, then the signal processing module generates a power adjusting signal so as to reduce a power of the first antenna or the second antenna transmitting a wireless signal.

According to an embodiment of the present invention, when the signal processing module determines that the second dielectric constant is equal to a human body dielectric constant and but the second metal identification signal is received, then the signal processing module does not generate the second control signal.

According to an embodiment of the present invention, when the signal processing module determines that the second dielectric constant is not equal to a human body dielectric constant, the signal processing module does not generate the second control signal.

In light of the above, the electronic device uses sensors to detect if there is an object approaching the first antenna or the second antenna. In addition, when an object approaches the first antenna or the second antenna, the electronic device uses the antenna without object around thereof to transmit wireless signals. Thus, under the circumstances of without affecting the operation performance of the electronic device, the specific absorption ratio (SAR) of the electronic device complies with the testing criterion and the communication quality of the electronic device can further be improved.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
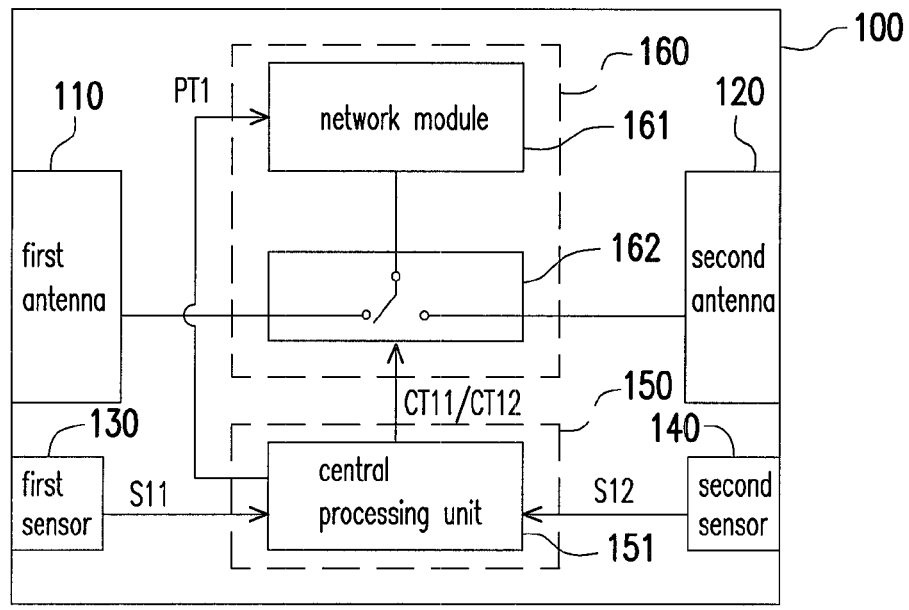
FIG. 1 is a block diagram illustrating an electronic device according to one embodiment of the present invention.

FIG. 1 is a block diagram illustrating an electronic device according to one embodiment of the present invention. Referring to FIG. 1, the electronic device 100 includes a first antenna 110, a second antenna 120, a first sensor 130, a second sensor 140, a signal processing module 150 and an antenna control module 160. Herein the first antenna 110 is disposed on a first side of the electronic device 100. The second antenna 120 is disposed on the second side of the electronic device 100. The first sensor 130 is adjacent to the first antenna 110 and the second sensor 140 is adjacent to the second antenna 120. In addition, in the present embodiment, the first side of the electronic device 100 is parallel to the second side. And the signal processing module 150 is composed of a central processing unit 151.

Along with the different design of products, the first sensor 130 can be adjacent to the first antenna 110 and located at the first side of the electronic device 100. The second sensor 140 can be adjacent to the second antenna 120 and located at the second side of the electronic device 100. The first antenna 110 and the second antenna 120 are the antennas for receiving/transmitting the same wireless signals. Along with the different demands of products, the first antenna 110 and the second antenna 120 can be used to receive 3G signals or Wireless LAN signals. In the following embodiment, the first antenna 110 and the second antenna 120 are used to receive 3G signals, whereas the scope of the present invention is not limited thereby.

Along with the requirement of product design, the first antenna 110 is commonly taken as the main antenna and has both functions of "receive" and "transmit" wireless signals after the electronic device 100 is actuated. The second antenna 120 is commonly taken as an auxiliary antenna and just has the function of "receive" wireless signals after the electronic device 100 is actuated. When the antenna receives wireless signals, the accuracy of receiving wireless signals by the antenna is frequently affected by the noise signals generated by the external environmental interference. Accordingly, two antennas for receiving the same wireless signals are commonly disposed within the electronic device, so as to proceed to the process of the noise signals by using of the wireless signals simultaneously received by the two antennas.

When the electronic device transmits wireless signals, it is hard to be affected by the external environmental interference, and thus only one single antenna is required to transmit signals with a larger power and the wireless signal transmitting can be completed. When the antenna transmits wireless signals, since transmitting wireless signals with a larger power is required, the radiated power of the antenna under transmitting condition may often larger than the radiated power of the antenna under receiving condition. Thus, in the specific absorption ratio (SAR) testing, the SAR value tested at the location where the antenna is transmitting wireless signals may larger than the SAR value tested at the location where the antenna is receiving wireless signals. Especially, when the antenna is used to transmit 3G signals, since the radiated power of transmitting the 3G signal is larger, the SAR value tested at the location where the antenna is transmitting 3G signals may exceed the standard criterion and it may harm the user being in the wireless transmitting antenna area of the electronic device.

In normal operation of the electronic device 100, the first antenna 110 is used to receive and transmit wireless signals and the second antenna 120 is just used to receive wireless signals. The first sensor 130 is adapted to detect whether a first object exists around the first antenna 110 and generate a first sensing signal S11 according to a detecting result. The signal processing module 150 is electrically connected to the first sensor 130, the second sensor 140 and the antenna control module 160, and generates a first signal CT11 when the first sensing signal S11 is received. Therefore, the antenna control module 160 switches the transmitting wireless signal function from the first antenna 110 to the second antenna 120 according to the first control signal CT11. In addition, when the first sensor 130 is unable to detect the first object for a predetermined time, i.e., when the signal processing module 150 is unable to receive the first sensing signal S11 for a predetermined time, it means that the first sensor 130 detects no object approaching around the first antenna 110. Then, the signal processing module 150 generates a second control signal CT12. Accordingly, the antenna control module 160 switches the transmitting wireless signal function from the second antenna 120 to the first antenna 110 according to the second control signal CT12.

In other words, when the first sensor 130 detects there is an object approaching the first antenna 110, it means that there may be a human body approaching the first antenna 110, it would harm the human body if the first antenna 110 is continuously used to transmit wireless signals. Thus, when the first sensor transmits the first sensing signal S11, the signal processing module 150 receives the first sensing signal S11 and generates the first control signal CT11. Therefore, the antenna control module 160 switches the transmitting wireless signal function from the first antenna 110 to the second antenna 120 according to the first control signal CT11. In this way, when the user touches or approaches the first antenna 110 of the electronic device 100, the electronic device 100 can transmit wireless signals through the second antenna 120 so as to reduce the electromagnetic waves affecting human bodies. The SAR value may further comply with the standard criterion and the electronic device 100 can maintain its original efficiency. Furthermore, since the electronic device 100 switches the second antenna 120 to transmit wireless signals, the total radiated power transmitted by the electronic device 100 almost can be maintained unchanged. Thus, the transmitted distance of the wireless signals may not be affected.

More specifically, the second sensor 140 is used to detect whether a second object exists around the second antenna 120, and generates a second sensing signal S12 when the second object of the second predetermined area around the second antenna 120 is detected. On the contrary, when the signal processing module 150 receives the second sensing signal S12, the signal processing module 150 generates a second control signal CT12, so that the antenna control module 160 switches the wireless signal transmitting function from the second antenna 120 to the first antenna 110 according to the second control signal CT12. In other words, when the user touches or approaches the second antenna 120 of the electronic device 100, the second sensor 140 detects that there is an object around the second antenna 120 so that the electronic device 100 transmits wireless signals through the first antenna 110. Thus, under the circumstances of without changing the total radiated power of the electronic device 100, the specific absorption ratio (SAR) complies with the testing criterion and the original efficiency of the electronic device 100 can further be maintained.

On the other hand, when the first sensor 130 and the second sensor 140 simultaneously detect that an object is approaching, the first sensor 130 and the second sensor 140 respectively generate the first sensing signal S11 and the second sensing signal S12. On the contrary, the signal processing module 150 may simultaneously receive the first sensing signal S11 and the second sensing signal S12. In this condition, the signal processing module 150 generates a power adjusting signal PT1, and the antenna control module 160 reduces the power of transmitting wireless signal of the first antenna 110 or the second antenna 120 according to the power adjusting signal PT1. In other words, when the user simultaneously touches the first antenna area and the second antenna area or approaches the first antenna 110 and the second antenna 120 of the electronic device 100, the electronic device 100 reduces the wireless signal transmitting power of the first antenna 110 or the second antenna 120, so that the SAR value complies with the standard criterion.

More specifically, in the present embodiment, the antenna control module 160 includes a network module 161 and a switching unit 162. Herein the network module 161 can be a wireless wide area network (WWAN) module. In addition, the switching unit 162 has a first terminal, second terminal and third terminal. The first terminal of the switching unit 162 is electrically connected with the network unit 161, the second terminal of the switching unit 162 is electrically connected with the first antenna 110 and the third terminal of the switching unit 162 is electrically connected with the second antenna 120.

In the operation, when the first control signal CT11 is received, the switching unit 162 conducts the first terminal to the third terminal so as to transmit wireless signals to the second antenna 120 for transmitting wireless signals to the outside. In addition, when the second control signal CT12 is received, the switching unit 162 conducts the first terminal to the second terminal so as to transmit wireless signals to the first antenna 110 for transmitting wireless signals to the outside.

Moreover, in the present embodiment, the first sensor 130 and the second sensor 140 can be light sensors, motion sensors or acceleration sensors.

It should be noted that, though the embodiment in FIG. 1 illustrates the internal structure of the signal processing module 150, it is not limited by the present invention. For example, the signal processing module 150 further includes a controller. The first sensor and the second sensor can be connected with the controller, wherein the controller can be an embedded controller. The controller can generate a first switching signal and a second switching signal to be transmitted to the central processing unit according to the first sensing signal and the second sensing signal transmitted by the first sensor and the second sensor. The central processing unit 151 can generate the first control signal or the second control signal according to the first switching signal or the second switching signal, and transmit the first control signal or the second signal to the antenna control module 160. The antenna control module 160 switches the wireless signal transmitting function from the first antenna to the second antenna or the second antenna to the first antenna, or simultaneously reduces the power of transmitting wireless signal of the first or second antenna according to the first control signal or the second control signal.

Figure 2:
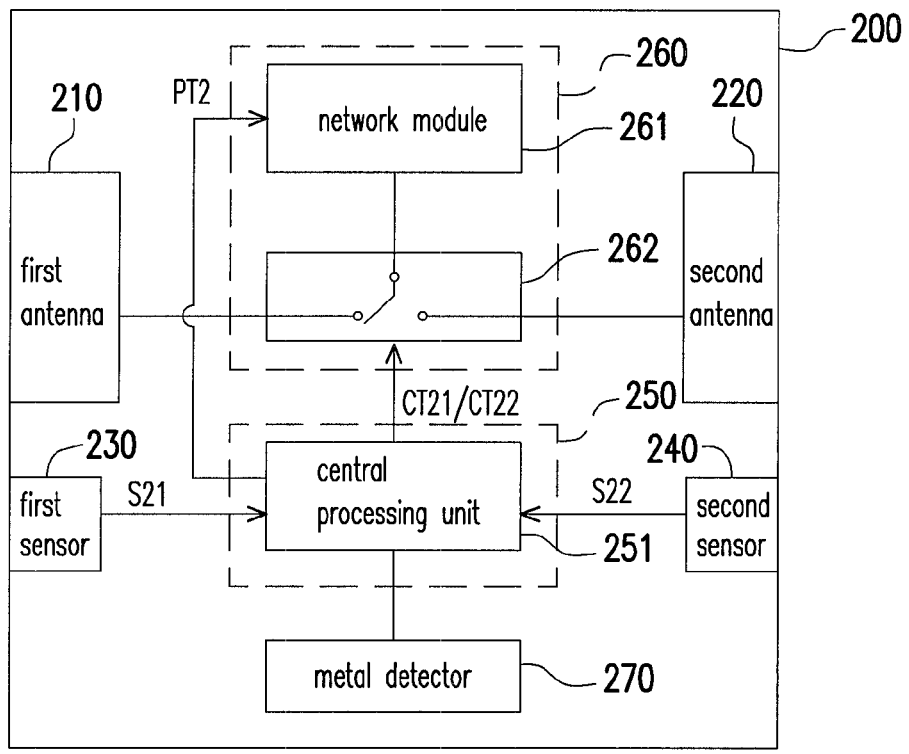
FIG. 2 is a block diagram illustrating an electronic device according to another embodiment of the present invention.

FIG. 2 is a block diagram illustrating an electronic device according to another embodiment of the present invention. Referring to FIG. 2, the electronic device 200 includes a first antenna 210, a second antenna 220, a first sensor 230, a second sensor 240, a signal processing module 250, an antenna control module 260 and a metal detector 270. Herein the first antenna 210 is disposed on a first side of the electronic device 200. The second antenna 220 is disposed on the second side of the electronic device 200. The first sensor 230 is adjacent to the first antenna 210 and the second sensor 240 is adjacent to the second antenna 220. In addition, in the present embodiment, the first side of the electronic device 200 is parallel to the second side. And the signal processing module 250 is composed of a central processing unit 251.

The first antenna 210 and the second antenna 220 are the antennas for receiving/transmitting the same wireless signals. Along with the different demands of products, the first antenna 210 and the second antenna 220 can used to receive 3G signals or Wireless LAN signals. In the following embodiment, the first antenna 210 and the second antenna 220 are used to receive 3G signals, whereas the scope of the present invention is not limited thereby. Along with the requirement of product design, the first antenna 210 is commonly taken as the main antenna and has both functions of "receive" and "transmit" wireless signals after the electronic device 200 is actuated. The second antenna 220 is commonly taken as an auxiliary antenna and just has the function of "receive" wireless signals after the electronic device 200 is actuated.

In normal operation of the electronic device 200, the first antenna 210 is used to receive and transmit wireless signals and the second antenna 120 is just used to receive wireless signals. The first sensor 230 is adapted to detect whether a first object exists around the first antenna 210 and generate a first dielectric constant S21 when the first object being around a first predetermined area of the first antenna 210 is detected. On the other hand, the metal detector 270 also determines the first object around the first predetermined area and determines whether the first object is a metal or not, and generates a first metal identification signal ID21 when the first object is determined as a metal. Along with the different features of the components, the metal detector 270 can also generate the first metal identification signal ID21 when the first object is determined as non-metal. In the present embodiment, the metal detector 270 generates the first metal identification signal ID21 when the first object is determined as metal, but it is not limited by the present invention.

The signal processing module 250 is electrically connected with the first sensor 230, the second sensor 240, the metal detector 270 and the antenna control module 260. In, the operation, the signal processing module 250 may determine whether the first dielectric constant S21 is equal to the human body dielectric constant through a look up table by using the first dielectric constant S21. In addition, since the metal identification signal ID21 is related to the material of the first object, the signal processing module 250 can identify whether the first object is a metal or not according to if the first metal identification signal ID21 is generated or not.

Thus, when the dielectric constant of the first object is equal to the human body dielectric constant and the first object is not a metal, i.e., when the first dielectric constant S21 is equal to human body dielectric constant and the first metal identification signal ID21 is not generated, it means that a human body approaches the location of the first antenna 210 of the electronic device 200. At this moment, the signal processing module 250 generates a first control signal CT21. Therefore, the antenna control module 260 switches the transmitting wireless signal function from the first antenna 210 to the second antenna 220 according to the first control signal CT21. In addition, when the first sensor 230 is unable to detect the first object for a predetermined time, i.e., when the signal processing module 250 is unable to receive the first dielectric constant S21 for a predetermined time, the signal processing module 250 generates a second control signal CT22. Accordingly, the antenna control module 260 switches the transmitting wireless signal function from the second antenna 220 to the first antenna 210 according to the second control signal CT22.

When the first sensor 230 detects the first object and the metal detector continuously transmits the first metal identification signal for a predetermined time, i.e., when the signal processing module 250 determines that the first object is around the first antenna 210 and the first object is a metal, the signal processing module 250 will not generate the first control signal CT21. When the signal processing module 250 determines that the first dielectric constant is not equal to a human body dielectric constant, the signal processing module 250 still does not generate the first control signal CT21.

In other words, when the signal processing module 250 determines that the object approaching the first antenna 210 is a human body, the first antenna 210 stops transmitting wireless signals and the transmitting wireless signal function is switched from the first antenna 210 to the second antenna 220. In this way, when the user touches the first antenna area or approaches the first antenna 210 of the electronic device 200, the electronic device 200 can transmit wireless signals through the second antenna 220 so that SAR value may comply with the standard criterion and the electronic device 200 can further maintain its original efficiency. Furthermore, since the electronic device 200 switches the second antenna 220 to transmit wireless signals, the total radiated power transmitted by the electronic device 200 almost can be maintained unchanged.

More specifically, the second sensor 240 is used to detect whether a second object exists around the second antenna 220 and generate a second dielectric constant S22 when the second object being around a second predetermined area of the second antenna 220 is detected. In addition, when the signal processing module 250 receives the second dielectric constant S22, the signal processing module 250 may determine whether the second dielectric constant S22 is equal to the human body dielectric constant through a look up table by using the second dielectric constant S22. Furthermore, the metal detector 270 also determines the second object around the second predetermined area and generates a second metal identification signal ID22 when the second object is determined as a metal. Along with the different features of the components, the metal detector 270 can also generate the second metal identification signal ID22 when the second object is determined as non-metal. In the present embodiment, the metal detector 270 generates the second metal identification signal ID22 when the second object is determined as metal, but it is not limited by the present invention.

Accordingly, when the dielectric constant of the second object is equal to the human body dielectric constant and the second object is not a metal, i.e., when the second dielectric constant S22 is equal to the human body dielectric constant and the signal processing module 250 does not received the second metal identification signal ID22, the signal processing module 250 generates a second control signal CT22, so that the antenna control module 260 switches the wireless signal transmitting function from the second antenna 220 to the first antenna 210 according to the second control signal CT22. In other words, when the user touches the second antenna area or approaches the second antenna 220 of the electronic device 200, the electronic device 200 transmits wireless signals through the first antenna 210. Thus, the specific absorption ratio (SAR) of the electronic device 200 complies with the testing criterion and the transmitted total radiated power is almost maintained unchanged so that the original efficiency of the electronic device 200 can further be maintained. When the signal processing module 250 determines that the second dielectric constant is equal to a human body dielectric constant and the second metal identification signal is received, then the signal processing module 250 does not generate the second control signal. When the signal processing module 250 determines that the second dielectric constant is not equal to a human body dielectric constant, the signal processing module 250 still does not generate the second control signal.

On the other hand, when the first sensor 230 and the second sensor 240 simultaneously detect that an object is approaching, the first sensor 230 and the second sensor 240 respectively generate the first dielectric constant S21 and the second dielectric constant S22. On the contrary, the signal processing module 250 may simultaneously receive the first dielectric constant S21 and the second dielectric constant S22. In this condition, the signal processing module 250 may determine whether both the first dielectric constant S21 and the second dielectric constant S22 are equal to the human body dielectric constant. When both the first dielectric constant S21 and the second dielectric constant S22 are equal to the human body dielectric constant and the first metal identification signal ID21 and the second metal identification signal ID22 are not generated, then the signal processing module 250 determines that the object approaching the first antenna 210 and the second antenna 220 is a human body and accordingly the signal processing module 250 generates a power adjusting signal PT2.

Therefore, the antenna control module 260 switches the transmitting wireless signal function from the first antenna 210 to the second antenna 220 according to the power adjusting signal PT2. In other words, when the user simultaneously touches the first antenna area and the second antenna area or approaches the first antenna 210 and the second antenna 220 of the electronic device 200, the electronic device 200 reduces the wireless signal transmitting power of the first antenna 110 or the second antenna 120, so that the SAR value complies with the standard criterion.

More specifically, in the present embodiment, the antenna control module 260 includes a network module 261 and a switching unit 262. Herein the network module 261 can be a WWAN module. In addition, the switching unit 262 has a first terminal, second terminal and third terminal. The first terminal of the switching unit 262 is electrically connected with the network unit 262, the second terminal of the switching unit 262 is electrically connected with the first antenna 210 and the third terminal of the switching unit 262 is electrically connected with the second antenna 220.

In the operation, when the first control signal CT21 is received, the switching unit 262 conducts the first terminal to the third terminal so as to transmit wireless signals to the second antenna 220 to transmit wireless signals to the outside. In addition, when the second control signal CT22 is received, the switching unit 262 conducts the first terminal to the second terminal so as to transmit wireless signals to the first antenna 210 for transmitting wireless signals to the outside.

Moreover, in the present embodiment, the first sensor 230 and the second sensor 240 can be capacitive proximity sensors. In addition, the metal detector 270 can be an electromagnetic sensor or an E-compass, for example.

Figure 3:
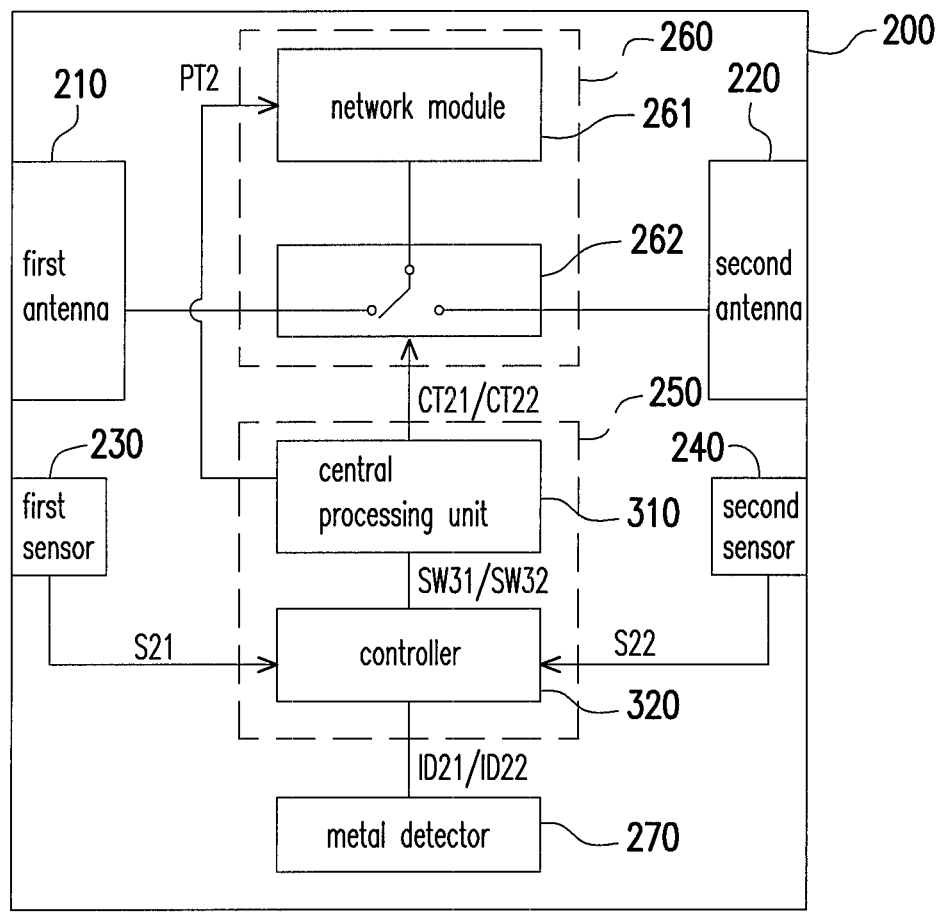
FIG. 3 is a block diagram illustrating an electronic device further according to another embodiment of the present invention.

It should be noted that, though the embodiment in FIG. 2 illustrates the internal structure of the signal processing module 250, it is not limited by the present invention. For example, FIG. 3 is a block diagram illustrating an electronic device further according to another embodiment of the present invention. Referring to FIG. 3, the signal processing module 250 includes a central processing unit 310 and a controller 320, wherein the controller can be an embedded controller, for example.

Referring to FIG. 3, the controller 320 is electrically connected to the sensor 230, the sensor 240 and the metal detector 270. The central processing unit 310 is electrically connected to the controller 320 and the antenna control unit 260. In the operation, when the controller 320 receives the first dielectric constant S21, the controller 320 may determine whether the first dielectric constant S21 is equal to the human body dielectric constant through a look up table by using the first dielectric constant S21. When the first dielectric constant S21 is equal to the human body dielectric constant and the first metal identification signal ID21 is not generated, the controller 320 generates a first switching signal SW31.

Therefore, the central processing unit 310 generates a first control signal CT21 according to the first switching signal SW31, so that the antenna control module 260 switches the transmitting wireless signal function from the first antenna 210 to the second antenna 220 according to the first control signal CT21. On the other hand, when the controller 320 does not receive the first dielectric constant S21 for a predetermined time, the controller 320 generates a second switching signal SW32. Therefore, the central processing unit 310 generates a second control signal CT22 according to the second switching signal SW32, so that the antenna control module 260 switches the transmitting wireless signal function from the second antenna 120 to the first antenna 110 according to the second control signal CT22.

In addition, when the controller 320 receives the second dielectric constant S22, the controller 320 may determine whether the second dielectric constant S22 is equal to the human body dielectric constant through a look up table by using the second dielectric constant S22. Additionally, when the second dielectric constant S22 is equal to the human body dielectric constant and the second metal identification signal ID22 is not generated, the controller 320 generates the second switching signal SW32. Therefore, the central processing unit 310 generates a second control signal CT22 according to the second switching signal SW32, so that the antenna control module 260 switches the transmitting wireless signal function from the second antenna 220 to the first antenna 220 according to the second control signal CT22.

In addition, when the controller 320 receives the first dielectric constant S21 and the second dielectric constant S22, the controller 320 may determine whether the first dielectric constant S21 and the second dielectric constant S22 are equal to the human body dielectric constant. In addition, when both the first dielectric constant S21 and the second dielectric constant S22 are equal to the human body dielectric constant and both the first metal identification signal ID21 and the second metal identification signal ID22 are not generated, then the signal processing module 320 actuates the central processing unit 310 so that the central processing unit 310 generates a power adjusting signal PT2. Therefore, the antenna control module 260 reduces the power of transmitting wireless signal of the first antenna 210 or the second antenna 220 according to the power adjusting signal PT2. The detailed operation of the embodiment in FIG. 3 is similar to that in the embodiment of FIG. 2 and thus not repeated herein.

Figure 4:
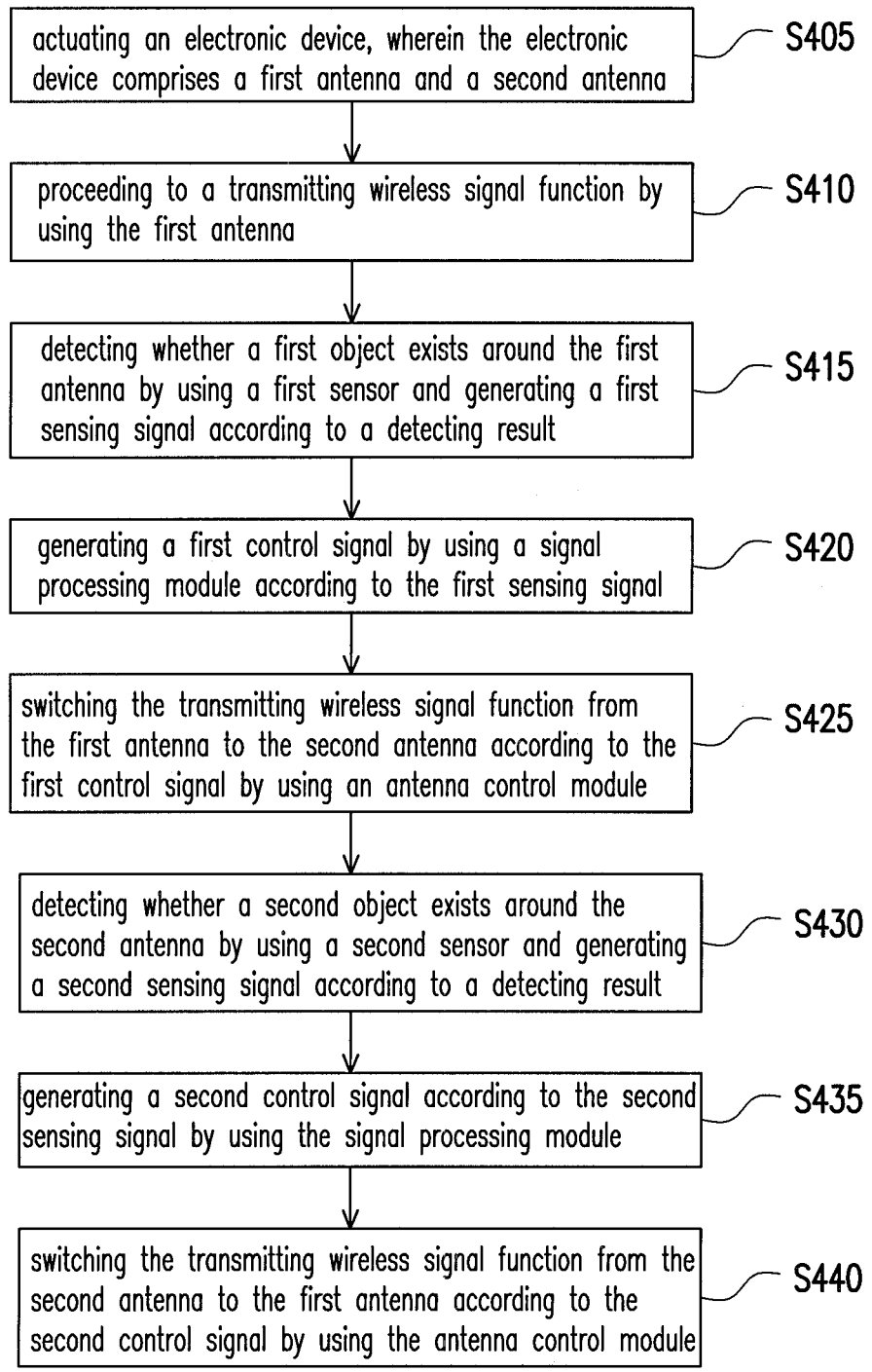
FIG. 4 is a flowchart of a control method of the electronic device according to the embodiment of FIG. 1.

FIG. 4 is a flowchart of a control method of the electronic device according to the embodiment of FIG. 1. First, the electronic device is actuated, wherein the electronic device comprises a first antenna and a second antenna (S405). Then, transmitting a wireless signal function by using the first antenna is proceeded (S410). After that, whether a first object exists around the first antenna is detected by using a first sensor and a first sensing signal is generated according to a detecting result (S415), wherein the first sensing signal is the signal generated by the first sensor when detecting that the first object exists within the first predetermined area around the first antenna. Then, a first control signal is generated according to the first sensing signal by using the signal processing module (S420). And then, the antenna control module is used to switch the transmitting wireless signal function from the first antenna to the second antenna according to the first control signal (S425). When the signal processing module is unable to receive the first sensing signal for a predetermined time, the signal processing module generates a second control signal, so that the antenna control module switches the wireless signal transmitting function from the second antenna to the first antenna.

Then, whether a second object exists around the second antenna is detected by using a second sensor and a second sensing signal is generated according to a detecting result (S430), wherein the second sensing signal is the signal generated by the second antenna when detecting that the second object exists within the second predetermined area around the second antenna. Then, a second control signal is generated according to the second sensing signal by using the signal processing module (S435). Finally, the antenna control module is used to switch the transmitting wireless signal function from the second antenna to the first antenna according to the second control signal (S440). The second sensor can be adjacent to the second antenna and located at the second side of the electronic device along with the different product design. The first sensor can be adjacent to the first antenna and located at the first side of the electronic device along with the different product design.

Figure 5:
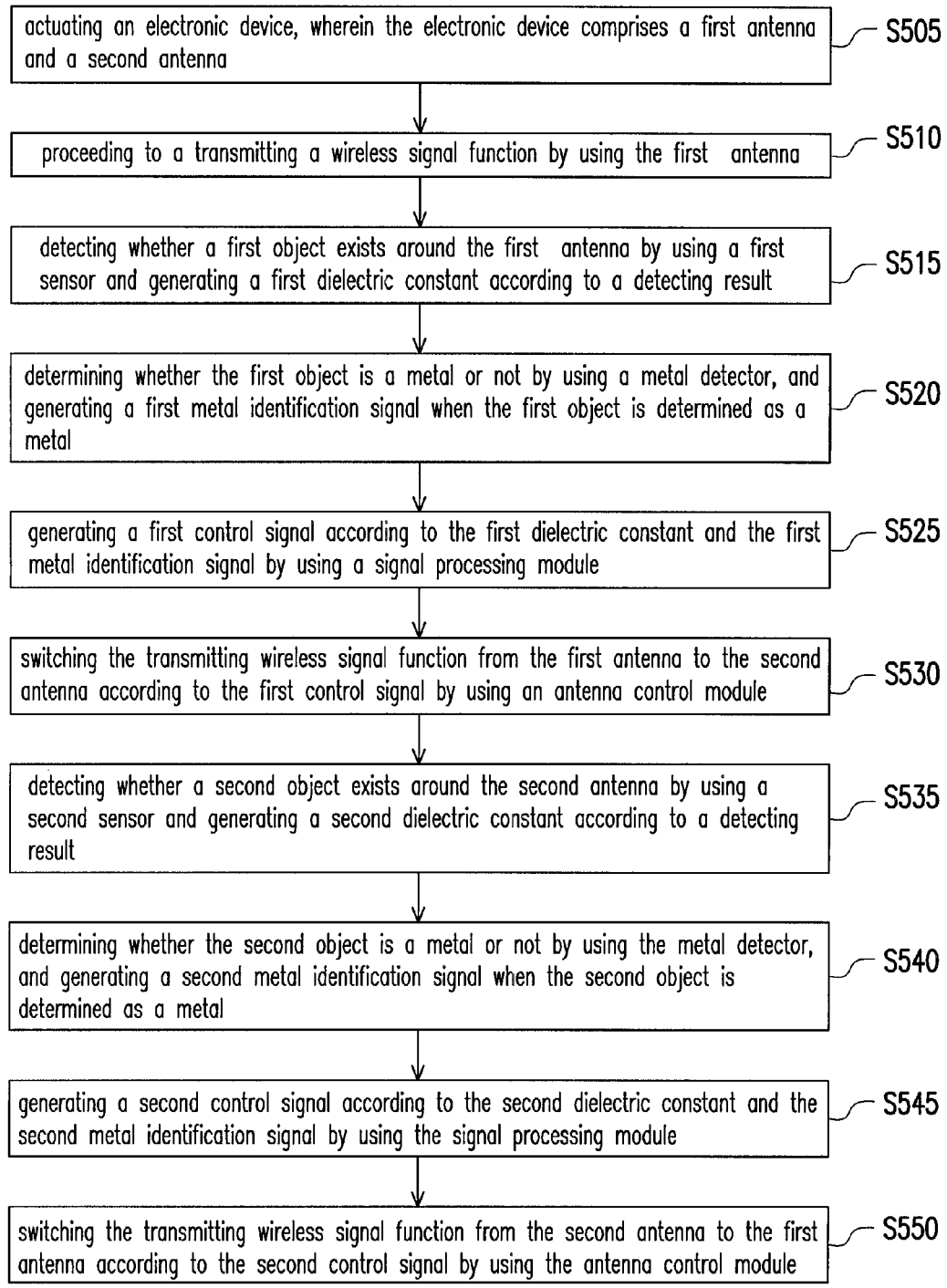
FIG. 5 is a flowchart of a control method of the electronic device according to the embodiment of FIG. 2.

FIG. 5 is a flowchart of a control method of the electronic device according to the embodiment of FIG. 2. First, the electronic device is actuated, wherein the electronic device comprises a first antenna and a second antenna (S505). Then, transmitting a wireless signal function by using the first antenna is proceeded (S510). After that, whether a first object exists around the first antenna is detected by using a first sensor and a first dielectric constant is generated according to a detecting result (S515), wherein the first dielectric constant is the signal generated by the first antenna when detecting that the first object exists within the first predetermined area around the first antenna and the first dielectric constant is the dielectric constant of the first object. Then, whether the first object is a metal or not is determined by using a metal detector, and a first metal identification signal is generated when the first object is determined as a metal (S520).

And then, a first control signal is generated according to the first dielectric constant and the first metal identification signal by using a signal processing module (S525). When the signal processing module determines that the first dielectric constant is equal to a human body dielectric constant and the first metal identification signal is not received, then the signal processing module generates the first control signal. When the signal processing module determines that the first dielectric constant is equal to a human body dielectric constant and but the first metal identification signal is not received, then the signal processing module does not generate the first control signal. When the signal processing module determines that the first dielectric constant is not equal to a human body dielectric constant, the signal processing module still does not generate the first control signal. And then, the antenna control module is used to switch the transmitting wireless signal function from the first antenna to the second antenna according to the first control signal (S530). When the signal processing module is unable to receive the first dielectric constant for a predetermined time, the signal processing module generates a second control signal, so that the antenna control module switches the wireless signal transmitting function from the second antenna to the first antenna.

Then, whether a second object exists around the second antenna is detected by using a second sensor and a second dielectric constant is generated according to a detecting result (S535), wherein the second dielectric constant is the signal generated by the second antenna when detecting that the second object exists within the second predetermined area around the second antenna and the second dielectric constant is the dielectric constant of the second object. Then, whether the second object is a metal or not is determined by using a metal detector and a second metal identification signal is generated when the second object is determined as a metal (S540). And then, a second control signal is generated according to the second dielectric constant and the second metal identification signal by using the signal processing module (S545).

When the signal processing module determines that both the first dielectric constant and the second dielectric constant are equal to the human body dielectric constant and both the first metal identification signal and the second metal identification signal are not received, then the signal processing module generates a power adjusting signal so as to reduce a power of the first antenna or, the second antenna transmitting a wireless signal. When the signal processing module determines that the second dielectric constant is equal to a human body dielectric constant and the second metal identification signal is received, then the signal processing module does not generate the second control signal. When the signal processing module determines that the second dielectric constant is not equal to a human body dielectric constant, the signal processing module still does not generate the second control signal. Finally, the antenna control module is used to switch the transmitting wireless signal function from the second antenna to the first antenna according to the second control signal (S550).

In light of the foregoing, the electronic device uses sensors to detect if there is an object approaching the first antenna or the second antenna. In addition, when an object approaches the first antenna or the second antenna, the electronic device uses the antenna without object around thereof to transmit electromagnetic waves. Thus, under the circumstances of without affecting the operation performance of the electronic device, the specific absorption ratio (SAR) of the electronic device complies with the testing criterion. In addition, when an object approaches the first antenna or the second antenna, the electronic device reduces the wireless signal transmitting power of the first antenna or the second antenna so that the specific absorption ratio (SAR) of the electronic device complies with the testing criterion. In other words, under the circumstances of without affecting the operation performance of the electronic device of the present invention, the specific absorption ratio (SAR) of the electronic device complies with the testing criterion and thus the communication quality of the electronic device can further be improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic device, comprising:
   a first antenna having a transmitting wireless signal function and disposed on a first side of the electronic device;
   a second antenna disposed on a second side of the electronic device;
   a first sensor adapted to detect whether a first object exists around the first antenna and generate a first sensing signal according to a detecting result;
   a second sensor adapted to detect whether a second object exists around the second antenna and generate a second sensing signal according to a detecting result;
   a signal processing module adapted to generate a first control signal according to the first sensing signal, wherein when the signal processing module simultaneously receives the first sensing signal and the second sensing signal, the signal processing module generates a power adjusting signal so as to reduce a power of the first antenna or the second antenna transmitting a wireless signal; and
   an antenna control module adapted to switch the transmitting wireless signal function from the first antenna to the second antenna according to the first control signal.

2. The electronic device as claimed in claim 1, wherein when the signal processing module is unable to receive the first sensing signal for a predetermined time, the signal processing module generates a second control signal so that the antenna control module switches the transmitting wireless signal function from the second antenna to the first antenna, wherein the first sensing signal is a signal generated by the first sensor when detecting that the first object exists within a first predetermined area around the first antenna.

3. The electronic device as claimed in claim 1, wherein when the signal processing module receives the second sensing signal, the signal processing module generates a second control signal so that the antenna control module switches the transmitting wireless signal function from the second antenna to the first antenna.

4. The electronic device as claimed in claim 1, wherein the second sensing signal is a signal generated by the second sensor when detecting that the second object exists within a second predetermined area around the second antenna.

5. The electronic device as claimed in claim 1, wherein the second sensor is adjacent to the second antenna and located at the second side.

6. The electronic device as claimed in claim 1, wherein the first sensor is a light sensor, a motion sensor or an acceleration sensor.

7. The electronic device as claimed in claim 1, wherein the signal processing module is formed by a central processing unit, and the central processing unit is electrically connected to the first sensor and the antenna control module.

8. The electronic device as claimed in claim 1, wherein the signal processing module comprises:
   a controller electrically connected to the first sensor, wherein a first switching signal is generated after the controller receives the first sensing signal; and
   a central processing unit electrically connected to the controller and the antenna control module, and generates the first control signal according to the first switching signal.

9. The electronic device as claimed in claim 1, wherein the antenna control module comprises:
   a network module; and
   a switching unit having a first terminal electrically connected to the network unit, a second terminal electrically connected to the first antenna and a third terminal electrically connected to the second antenna, wherein the switching unit conducts the first terminal to the third terminal according to the first control signal.

10. The electronic device as claimed in claim 9, wherein the network module is a wireless wide area network module.

11. The electronic device as claimed in claim 1, wherein the. first side of the electronic device is parallel to the second side.

12. The electronic device as claimed in claim 1, wherein the first sensor is adjacent to the first antenna and located at the first side.

13. An electronic device, comprising:
   a first antenna having a transmitting wireless signal function and disposed on a first side of the electronic device;
   a second antenna disposed on a second side of the electronic device;

a first sensor adapted to detect whether a first object exists around the first antenna and generate a first dielectric constant according to a detecting result;

a metal detector adapted to determine whether the first object is a metal or not, and generate a first metal identification signal when the first object is determined as a metal;

a signal processing module adapted to generate a first control signal according to the first dielectric constant and the first metal identification signal; and an antenna control module adapted to switch the transmitting wireless signal function from the first antenna to the second antenna according to the first control signal.

14. The electronic device as claimed in claim 13, wherein when the signal processing module is unable to receive the first dielectric constant for a predetermined time, the signal processing module generates a second control signal so that the antenna control module switches the transmitting wireless signal function from the second antenna to the first antenna, wherein the first dielectric constant is a signal generated by the first sensor when detecting that the first object exists within a first predetermined area around the first antenna, and the first dielectric constant is a dielectric constant of the first object.

15. The electronic device as claimed in claim 13, wherein when the signal processing module determines that the first dielectric constant is equal to a human body dielectric constant and the first metal identification signal is not received, then the signal processing module generates the first control signal so that the antenna control module switches the transmitting wireless signal function from the first antenna to the second antenna.

16. The electronic device as claimed in claim 13, wherein when the signal processing module determines that the first dielectric constant is equal to a human body dielectric constant and the first metal identification signal is received, then the signal processing module does not generate the first control signal.

17. The electronic device as claimed in claim 13, wherein when the signal processing module determines that the first dielectric constant is not equal to a human body dielectric constant, the signal processing module does not generate the first control signal.

18. The electronic device as claimed in claim 13, further comprising:

a second sensor adapted to detect whether a second object exists around the second antenna and generate a second dielectric constant according to a detecting result, wherein the metal detector determines whether the second object is a metal or not, and generates a second metal identification signal when the second object is determined as a metal.

19. The electronic device as claimed in claim 18, wherein the signal processing module generates a second control signal according to the second dielectric constant and the second metal identification signal, so that the antenna control module switches the transmitting wireless signal function from the second antenna to the first antenna, wherein the second dielectric constant is a signal generated by the second sensor when detecting that the second object exists within a second predetermined area around the second antenna, and the second dielectric constant is a dielectric constant of the second object.

20. The electronic device as claimed in claim 18, wherein when the signal processing module determines that both the first dielectric constant and the second dielectric constant are equal to a human body dielectric constant and the first metal identification signal and the second metal identification signal are not received, then the signal processing module generates a power adjusting signal so to reduce a power of the first antenna or the second antenna transmitting a wireless signal.

21. The electronic device as claimed in claim 18, wherein when the signal processing module determines that the second dielectric constant is equal to a human body dielectric constant and but the second metal identification signal is received, then the signal processing module does not generate the second control signal.

22. The electronic device as claimed in claim 18, wherein when the signal processing module determines that the second dielectric constant is not equal to a human body dielectric constant, the signal processing module does not generate the second control signal.

23. The electronic device as claimed in claim 13, wherein the first sensor is a capacitive proximity sensor.

24. The electronic device as claimed in claim 13, wherein the metal detector is an electromagnetic sensor or an E-compass.

25. The electronic device as claimed in claim 13, wherein the signal processing module is formed by a central processing unit, and the central processing unit is electrically connected to the first sensor, the metal detector and the antenna control module.

26. The electronic device as claimed in claim 13, wherein the signal processing module comprises:

a controller electrically connected to the first sensor and the metal detector and determines whether the first dielectric constant is equal to a human body dielectric constant through a lookup table, wherein when the first dielectric constant is equal to the human body dielectric constant and the controller does not receive the first metal identification signal, the controller generates a first switching signal; and a central processing unit electrically connected to the controller and the antenna control module, and generates the first control signal according to the first switching signal.

27. The electronic device as claimed in claim 26, wherein the controller is an embedded controller.

28. An electronic device control method, comprising:

(a) actuating an electronic device, wherein the electronic device comprises a first antenna and a second antenna;

(b) proceeding to a transmitting a wireless signal function by using the first antenna;

(c) detecting whether a first object exists around the first antenna by using a first sensor and generating a first sensing signal according to a detecting result;

(d) generating a first control signal according to the first sensing signal by using a signal processing module;

(e) switching the transmitting wireless signal function from the first antenna to the second antenna according to the first control signal by using an antenna control module; and (f) detecting whether a second object exists around the second antenna by using a second sensor and generating a second sensing signal according to a detecting result, wherein when the signal processing module simultaneously receives the first sensing signal and the second sensing signal, the signal processing module generates a power adjusting signal so as to reduce a power of the first antenna or the second antenna transmitting a wireless signal.

29. The electronic device control method as claimed in claim 28, wherein when the signal processing module is unable to receive the first sensing signal for a predetermined time, the signal processing module generates a second control signal so that the antenna control module switches the transmitting wireless signal function from the second antenna to the first antenna, wherein the first sensing signal is a signal generated by the first sensor when detecting that the first object exists within a first predetermined area around the first antenna.

30. The electronic device control method as claimed in claim 28, further comprising:
(g) generating a second control signal according to the second sensing signal by using the signal processing module; and
(h) switching the transmitting wireless signal function from the second antenna to the first antenna according to the second control signal by using the antenna control module.

31. The electronic device control method as claimed in claim 28, wherein the second sensing signal is a signal generated by the second sensor when detecting that the second object exists within a second predetermined area around the second antenna.

32. The electronic device control method as claimed in claim 28, wherein the second sensor is adjacent to the second antenna and located at a second side of the electronic device.

33. The electronic device control method as claimed in claim 28, wherein a first side of the electronic device is parallel to the second side.

34. The electronic device control method as claimed in claim 28, wherein the first sensor is adjacent to the first antenna and located at the first side.

35. An electronic device control method, comprising:
(a) actuating an electronic device, wherein the electronic device comprises a first antenna and a second antenna;
(b) proceeding to a transmitting wireless signal function by using the first antenna;
(c) detecting whether a first object exists around the first antenna by using a first sensor and generating a first dielectric constant according to a detecting result;
(d) determining whether the first object is a metal or not by using a metal detector, and generating a first metal identification signal when the first object is determined as a metal;
(e) generating a first control signal by using a signal processing module according to the first dielectric constant and the first metal identification signal; and
(f) switching the transmitting wireless signal function from the first antenna to the second antenna according to the first control signal by using an antenna control module.

36. The electronic device control method as claimed in claim 35, wherein when the signal processing module is unable to receive the first dielectric constant for a predetermined time, the signal processing module generates a second control signal so that the antenna control module switches the transmitting wireless signal function from the second antenna to the first antenna, wherein the first dielectric constant is a signal generated by the first sensor when detecting that the first object exists within a first predetermined area around the first antenna, and the first dielectric constant is a dielectric constant of the first object.

37. The electronic device control method as claimed in claim 35, wherein when the signal processing module determines that the first dielectric constant is equal to a human body dielectric constant and the first metal identification signal is not received, then the signal processing module generates the first control signal so that the antenna control module switches the transmitting wireless signal function from the first antenna to the second antenna.

38. The electronic device control method as claimed in claim 35, wherein when the signal processing module determines that the first dielectric constant is equal to a human body dielectric constant and but the first metal identification signal is received, then the signal processing module does not generate the first control signal.

39. The electronic device control method as claimed in claim 35, wherein when the signal processing module determines that the first dielectric constant is not equal to a human body dielectric constant, the signal processing module does not generate the first control signal.

40. The electronic device control method as claimed in claim 35, further comprising:
(g) detecting whether a second object exists around the second antenna by using a second sensor and generating a second dielectric constant according to a detecting result;
(h) determining whether the second object is a metal or not by using the metal detector, and generating a second metal identification signal when the second object is determined as a metal;
(i) generating a second control signal according to the second dielectric constant and the second metal identification signal by using the signal processing module; and
(j) switching the transmitting wireless signal function from the second antenna to the first antenna according to the second control signal by using the antenna control module.

41. The electronic device control method as claimed in claim 40, wherein the second dielectric constant is a signal generated by the second sensor when detecting that the second object exists within a second predetermined area around the second antenna, and the second dielectric constant is a dielectric constant of the second object.

42. The electronic device control method as claimed in claim 40, wherein when the signal processing module determines that both the first dielectric constant and the second dielectric constant are equal to a human body dielectric constant and the first metal identification signal and the second metal identification signal are not received, then the signal processing module generates a power adjusting signal so as to reduce a power of the first antenna or the second antenna transmitting a wireless signal.

43. The electronic device control method as claimed in claim 40, wherein when the signal processing module determines that the second dielectric constant is equal to a human body dielectric constant and but the second metal identification signal is received, then the signal processing module does not generate the second control signal.

44. The electronic device control method as claimed in claim 40, wherein when the signal processing module determines that the second dielectric constant is not equal to a human body dielectric constant, the signal processing module does not generate the second control signal.

* * * * *